(12) United States Patent
Eickholt

(10) Patent No.: US 10,822,043 B1
(45) Date of Patent: Nov. 3, 2020

(54) METHOD OF INTERCONNECTING A CHASSIS AND A BODY

(71) Applicant: Mahindra N.A. Tech Center, Auburn Hills, MI (US)

(72) Inventor: Robert J. Eickholt, Franklin, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 0 days.

(21) Appl. No.: 16/433,281

(22) Filed: Jun. 6, 2019

(51) Int. Cl.
*B62D 65/18* (2006.01)
*B62D 65/02* (2006.01)
*B65G 47/61* (2006.01)

(52) U.S. Cl.
CPC .......... *B62D 65/18* (2013.01); *B62D 65/022* (2013.01); *B65G 47/61* (2013.01); *B23P 2700/50* (2013.01); *B65G 2201/0294* (2013.01)

(58) Field of Classification Search
CPC ...... B62D 65/022; B62D 65/18; B65G 9/004; B65G 17/20; B65G 47/61; B65G 2201/0294; B23P 2700/50
See application file for complete search history.

(56) References Cited

U.S. PATENT DOCUMENTS

| 4,464,998 | A | | 8/1984 | Wakabayashi | |
|---|---|---|---|---|---|
| 5,027,502 | A | * | 7/1991 | Sakamoto | B62D 65/12 29/783 |
| 6,109,424 | A | | 8/2000 | Doan | |
| 6,427,321 | B2 | * | 8/2002 | Fedato | B62D 65/18 29/281.5 |
| 6,604,279 | B2 | | 8/2003 | Kurtz | |
| 6,695,126 | B2 | | 2/2004 | Minamikawa | |

(Continued)

FOREIGN PATENT DOCUMENTS

| CN | 201071223 Y | 6/2008 |
|---|---|---|
| CN | 204161512 U | 2/2015 |

(Continued)

OTHER PUBLICATIONS

International Search Report from corresponding PCT/US2020/034851, dated Sep. 3, 2020.

(Continued)

*Primary Examiner* — Gene O Crawford
*Assistant Examiner* — Keith R Campbell
(74) *Attorney, Agent, or Firm* — Harness, Dickey & Pierce, P.L.C.

(57) ABSTRACT

A method of interconnecting a vehicle chassis and body includes supporting the chassis on a first carrier and supporting the body on a second carrier suspended in a positive z-direction with respect to the first carrier; translating the first carrier in the positive z-direction; interconnecting the chassis and the body; and shifting supports coupled to the second carrier and spaced apart from the body from a first position in a path of travel of the chassis to a second position outside of the path by pivoting each support about a pivot axis. The method also includes shifting the supports from the second to the first position by pivoting each support about the pivot axis; translating the first carrier in a negative z-direction toward the supports; and supporting the interconnected chassis and body on the second carrier by engaging the chassis with the plurality of supports in the first position.

20 Claims, 7 Drawing Sheets

(56) References Cited

U.S. PATENT DOCUMENTS

| | | |
|---|---|---|
| 6,766,894 B2 | 7/2004 | Arai et al. |
| 7,484,616 B2 | 2/2009 | Nakamura |
| 8,297,604 B2 | 10/2012 | Doan et al. |
| 9,056,728 B2 * | 6/2015 | Choi ...................... B65D 65/18 |
| 9,061,828 B2 | 6/2015 | Monti et al. |
| 9,193,542 B2 | 11/2015 | Covizzi |
| 9,359,138 B2 | 6/2016 | Hamada et al. |
| 2004/0007440 A1 * | 1/2004 | Doan ...................... B62D 65/18 |
| | | 198/468.8 |
| 2009/0123264 A1 | 5/2009 | Hartmann et al. |
| 2015/0239078 A1 | 8/2015 | Cardani et al. |
| 2018/0154964 A1 | 6/2018 | Sim et al. |

FOREIGN PATENT DOCUMENTS

| | | |
|---|---|---|
| JP | 2013-095332 A | 5/2013 |
| WO | WO-2010-076440 A1 | 7/2010 |

OTHER PUBLICATIONS

Written Opinion from corresponding PCT/US2020/034851, dated Sep. 3, 2020.

* cited by examiner

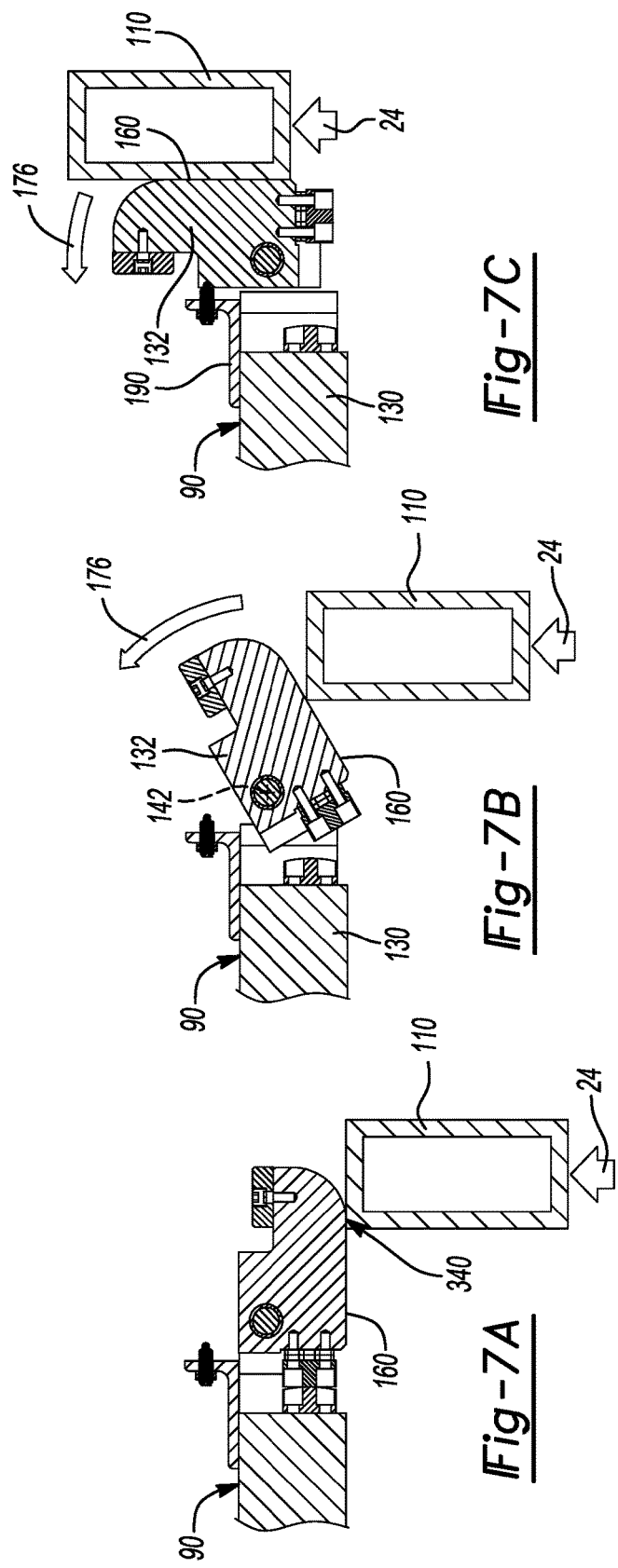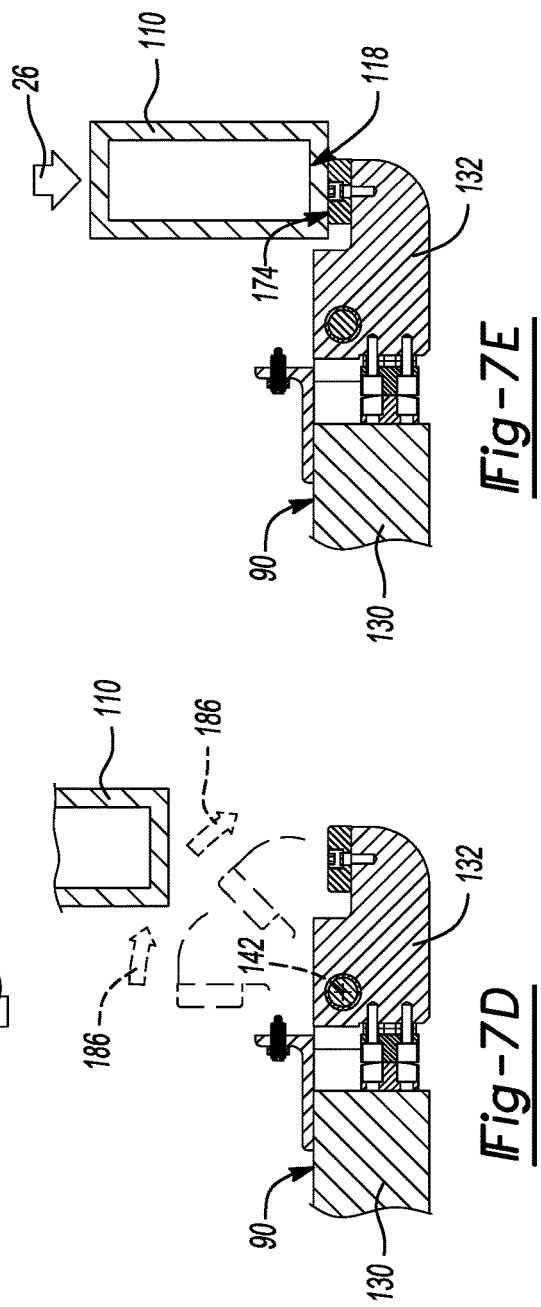

METHOD OF INTERCONNECTING A CHASSIS AND A BODY

FIELD

The present disclosure relates to a method of interconnecting a vehicle chassis and a vehicle body.

BACKGROUND

This section provides background information related to the present disclosure which is not necessarily prior art.

Vehicle assembly generally includes interconnecting a vehicle chassis with a vehicle body, also referred to as marriage of the chassis and body. Chassis and body subassemblies may be assembled separately and joined at a marriage station. After being interconnected to one another, the chassis and body may travel together for subsequent processing.

SUMMARY

This section provides a general summary of the disclosure, and is not a comprehensive disclosure of its full scope or all of its features.

The present disclosure provides a method of interconnecting a chassis and a body of a vehicle. The method includes supporting the chassis on a first carrier. The method also includes supporting the body on a second carrier. The second carrier is suspended in a positive z-direction with respect to the first carrier. The method also includes translating the first carrier in the positive z-direction toward the second carrier. The method also includes interconnecting the chassis and the body to form an interconnected chassis and body. The method also includes shifting a plurality of supports from a first position to a second position. The first position is in a path of travel of the chassis. The second position is outside of the path of travel of the chassis. The plurality of supports is shifted from the first position to the second position by pivoting at least a portion of each support of the plurality of supports about a pivot axis. The plurality of supports is coupled to the second carrier and spaced apart from the body. The method also includes shifting the plurality of supports from the second position to the first position by pivoting at least a portion of each support of the plurality of supports about the pivot axis. The method also includes translating the first carrier in a negative z-direction toward the plurality of supports. The method also includes supporting the interconnected chassis and body on the second carrier by engaging the chassis with the plurality of supports in the first position.

In some configurations, shifting the plurality of supports from the first position to the second position is performed concurrently with translating the first carrier in the positive z-direction.

In some configurations, shifting the plurality of supports from the first position to the second position comprises slidingly engaging the chassis with the at least a portion of each support of the plurality of supports during translating the first carrier in the positive z-direction.

In some configurations, shifting the plurality of supports from the second position to the first position comprises disengaging the chassis from the at least a portion of each support of the plurality of supports.

In some configurations, shifting the plurality of supports from the second position to the first position further comprises engaging a surface of the at least a portion of each support of the plurality of supports with a respective spring-loaded stop. The spring-loaded stop is adapted to apply a biasing force to pivot the at least a portion about the pivot axis to return the plurality of supports to the first position.

In some configurations, each support of the plurality of supports is biased in the first position.

In some configurations, interconnecting the chassis and the body is performed concurrently with translating the first carrier in the positive z-direction.

In some configurations, shifting the plurality of supports from the second position to the first position is performed concurrently with translating the first carrier in the positive z-direction.

In some configurations, the method further comprises disengaging the body from the second carrier.

In some configurations, disengaging the body from the second carrier is performed during translating the first carrier in the positive z-direction and after interconnecting the chassis and the body.

In some configurations, interconnecting the chassis and the body is performed prior to shifting the plurality of supports from the first position to the second position.

In some configurations, supporting the chassis on the first carrier comprises engaging the first carrier with a first region on the chassis. Supporting the interconnected chassis and body on the second carrier comprises engaging the plurality of supports with a second region on the chassis.

In some configurations, the method further comprises disengaging the first carrier from the chassis after supporting the interconnected chassis and body on the second carrier.

In some configurations, supporting the interconnected chassis and body on the second carrier and disengaging the first carrier from the chassis are performed concurrently with translating the first carrier in the negative z-direction.

In some configurations, the method further comprises aligning the chassis and the body along an x-axis and a y-axis by adjusting locations of at least one of the first carrier and the second carrier.

In some configurations, adjusting locations of at least one of the first carrier and the second carrier comprises engaging the first carrier with a four-post lift and engaging the second carrier with the four-post lift. The four-post lift is adapted to translate the first carrier along a z-axis.

In some configurations, the method further comprises adjusting locations of one or more supports of the plurality of supports on the second carrier along at least one of an x-axis and a y-axis.

In some configurations, the method further comprises coupling the chassis to the body after interconnecting the chassis to the body.

In some configurations, each support of the plurality of supports comprises a base coupled to the second carrier and a finger pivotally connected to the base. The at least a portion of each support of the plurality of supports comprises the finger.

In some configurations, the finger includes a rounded portion. The rounded portion is adapted to engage the chassis during the translating the chassis in the positive z-direction. The finger includes a planar portion. The planar portion is adapted to engage the chassis during supporting the interconnected chassis and body on the second carrier.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
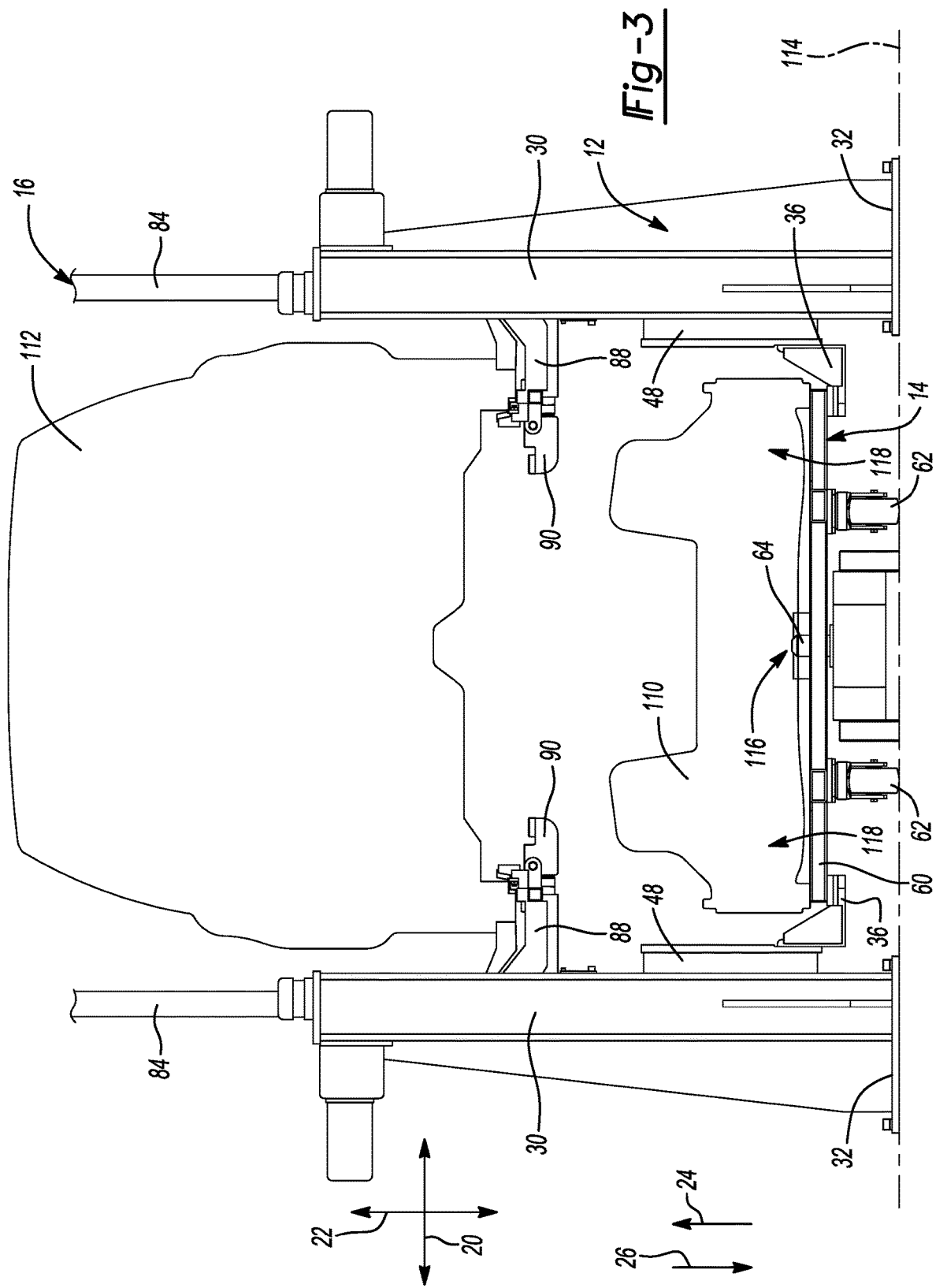
FIG. 3 is a back view of the marriage station of FIG. 2, the marriage station being in communication with a chassis and a body of a vehicle.
Figure 6:
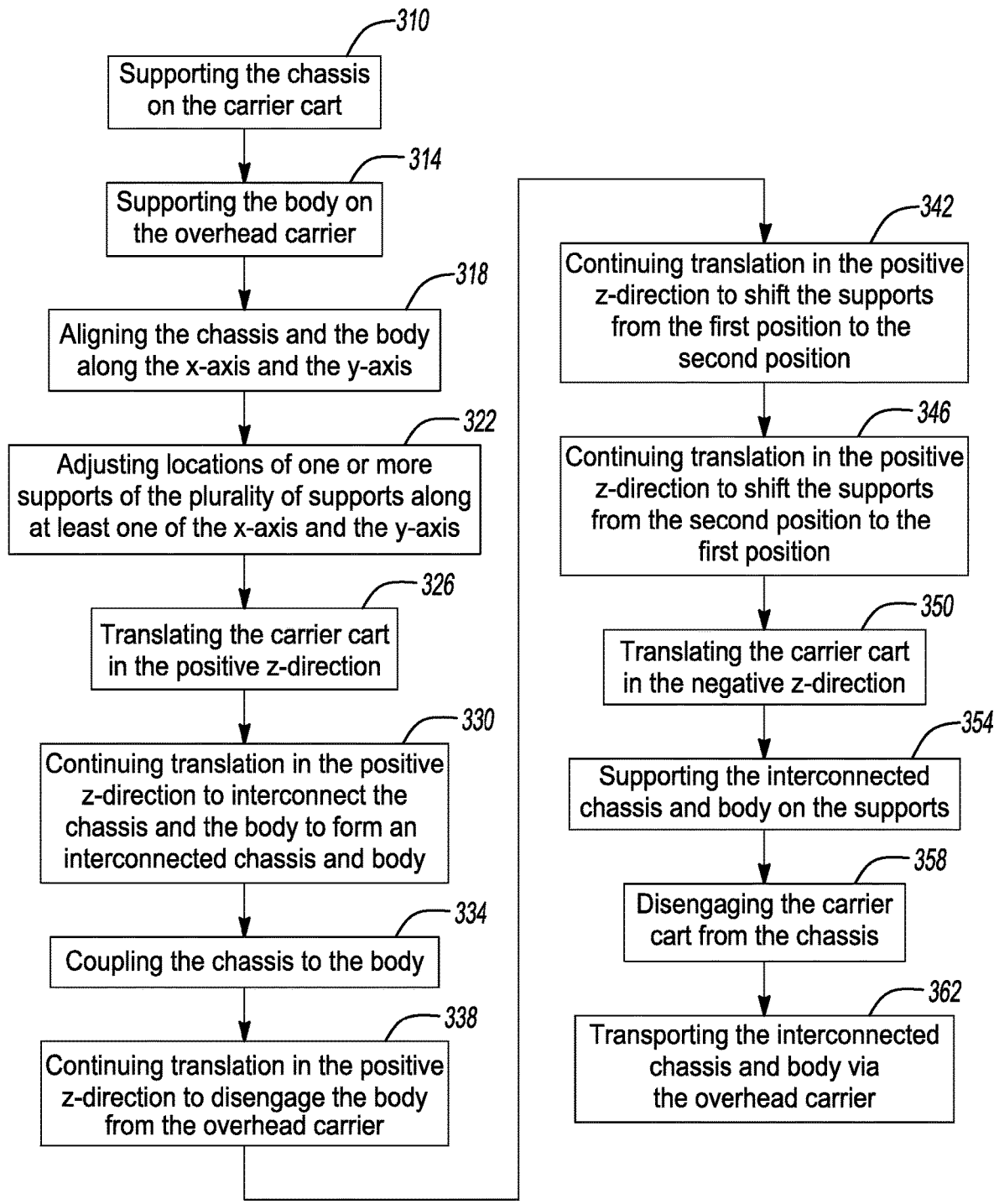

FIG. 6 is a flowchart depicting a method of interconnecting the chassis and the body at the marriage station of FIG. 3 according to the principles of the present disclosure; and FIGS. 7A-7E relate to the method of FIG. 6; FIG. 7A shows the chassis being translated in a positive z-direction direction and engaging a rounded portion of the support in a first position; FIG. 7B shows the chassis slidingly engaging the rounded portion of the support; FIG. 7C shows the chassis slidingly engaging the rounded portion of the support in a second position; FIG. 7D shows the chassis disengage from the support, the support returning to the first position; and FIG. 7E shows the chassis engaging a planar portion of the support, the support being in the first position.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

A vehicle assembly process according to the principles of the present disclosure includes interconnecting or marriage of a vehicle chassis with a vehicle body. The assembly process may include separately transferring the chassis and the body into the marriage station, such as on first and second carriers, respectively. Interconnecting the chassis and the body generally includes lifting the chassis past pivotable supports on the second carrier and into engagement with the body so that the chassis and body are lifted together. The pivotable supports are pivoted out of a traveling path of the chassis due to engagement with the chassis. The chassis and body are lifted past the pivotable supports so that the pivotable supports fall into the traveling path of the chassis, and then the chassis and body are lowered onto the pivotable supports to be supported by the second carrier. After the chassis and body are interconnected, they are coupled to one another, such as by a plurality of fasteners. The assembly may be transferred out of the marriage station via the second carrier and optionally proceed to additional assembly stations.

Figure 1:
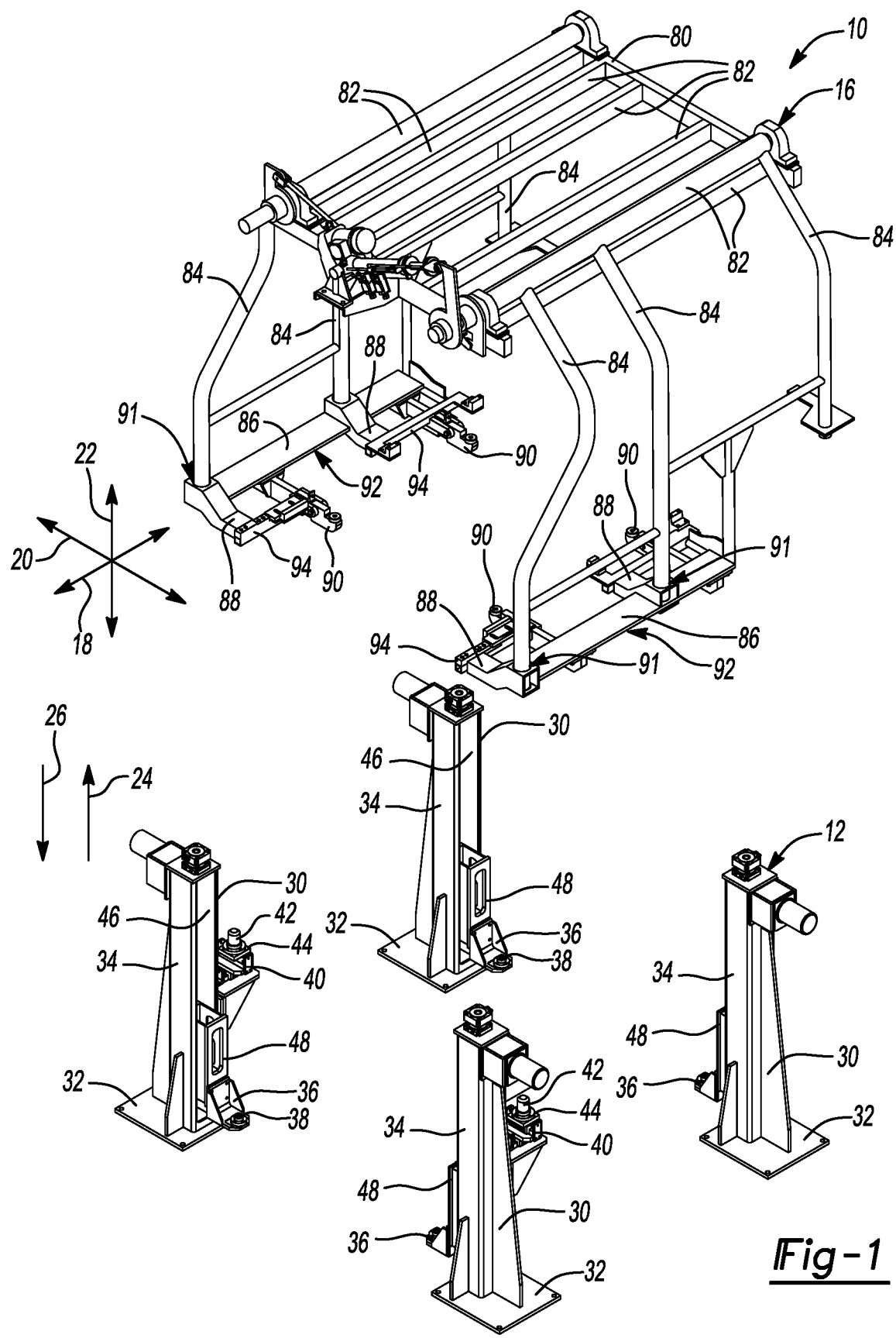
FIG. 1 is a perspective view of a marriage station according to the principles of the present disclosure, the marriage station being in a disengaged configuration.
Figure 2:
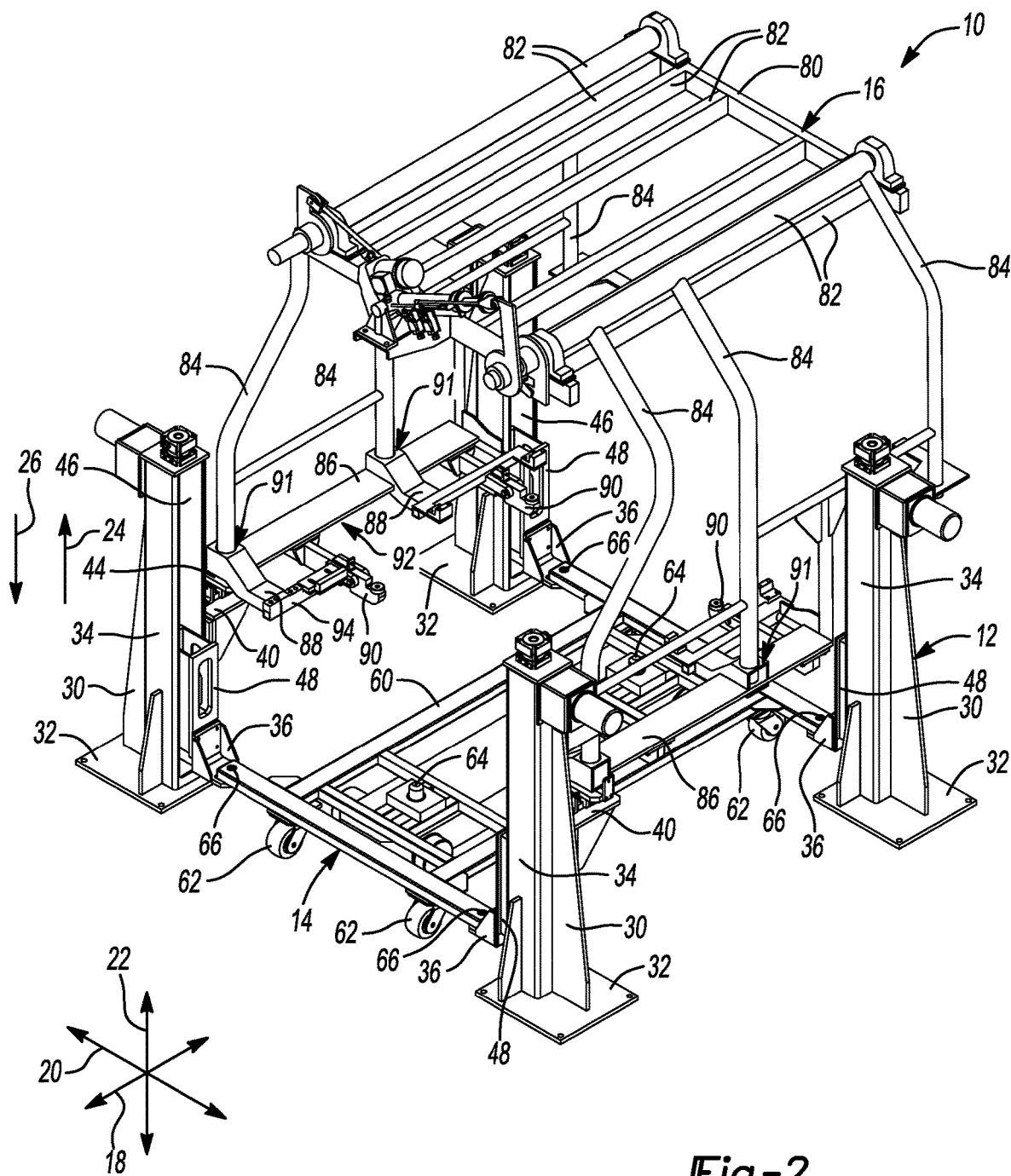
FIG. 2 is a perspective view of the marriage station of FIG. 2, the marriage station being in an engaged configuration.

With reference to FIGS. 1-2, a chassis and body marriage station 10 according to the principles of the present disclosure is provided. The marriage station includes a lift 12, a first carrier or carrier cart 14 (FIG. 2), and a second carrier or overhead carrier 16. The lift 12 may have a fixed location.

In certain embodiments, the lift 12 may be coupled to a floor (see, e.g., floor 114 of FIG. 3). The carrier cart 14 and the overhead carrier 16 may each be adapted to travel in an orthogonal coordinate system including an x-axis 18, a y-axis 20, and a z-axis 22.

The carrier cart 14 may be adapted to travel long a surface (see, e.g., floor 114 of FIG. 3). The carrier cart 14 may travel in direct communication with the surface or indirect communication with the surface (such as on rails or tracks that are coupled to the surface). The carrier cart 14 is adapted to travel along at least one of the x-axis 18 and the y-axis. In certain embodiments, the carrier cart 14 is movable along a single axis along the surface, such as when the carrier cart moves along rails or tracks. The carrier cart 14 may also be movable along both the x-axis 18 and the y-axis 20 along the surface. In certain embodiments, the carrier cart 14 is an automatic guided vehicle (AGV). The carrier cart 14 is adapted to be lifted in a positive z-direction 24 substantially parallel to the z-axis 22 and lowered in a negative z-direction 26 opposite the positive z-direction 24.

FIG. 1 depicts the marriage station 10 in a disengaged configuration, with the overhead carrier 16 disposed above the lift 12. The overhead carrier 16 may be aligned with the lift 12 along the x-axis 18 and the y-axis 20. FIG. 2 depicts the marriage station 10 in an engaged configuration with the carrier cart 14 and the overhead carrier 16 engaging the lift 12 and aligned with one another along the x-axis 18 and the y-axis 20. The carrier cart 14 and the overhead carrier 16 are spaced apart along the z-axis 22, with the overhead carrier 16 being disposed above the carrier cart in the positive z-direction 24.

The overhead carrier 16 may be coupled to an overhead rail system (not shown). The overhead carrier 16 may be movable with respect to the overhead rail system along at least one of the x-axis 18 and the y-axis 20. The overhead carrier 16 may be translated along the z-axis 22 while remaining coupled to the overhead rail system.

The lift 12 may include a plurality of posts 30. The posts 30 may extend from the floor substantially parallel to the z-axis 22. A quantity of posts 30 may be four, such that the lift 12 may be referred to as a four-post lift. Each post includes an anchor 32 and a stem 34. The anchor 32 may be coupled to the floor. The stem 34 may extend in the positive z-direction 24 from the anchor 32.

The lift 12 may include one or more first or lower locators 36. In certain embodiments, the lift 12 includes four lower locators 36, each lower locator 36 being coupled to a respective post 30. The lower locators 36 are adapted to engage the carrier cart 14 to locate the carrier cart 14 within the lift 12. The location of the carrier cart 14 may be adjusted along one or more of the x-axis 18 and the y-axis 20 with respect to the lift 12 to engage the carrier cart 14 with the lower locators 36. Each lower locator 36 may include a first or lower locating pin 38 (FIG. 1) adapted to engage the carrier cart 14.

The lift 12 may include one or more second or upper locators 40. In certain embodiments, the lift 12 includes two upper locators 40. The upper locators 40 may be coupled to adjacent posts 30. In other embodiments, the lift 12 may include four upper locators 40, each being coupled to a respective post 30. The upper locators 40 are adapted to engage the overhead carrier 16 to locate the overhead carrier 16 into engagement with the lift 12. The location of the overhead carrier 16 may be adjusted along the z-axis 22, and one or more of the x-axis 18 and the y-axis 20 with respect to the lift 12 to engage the overhead carrier 16 with the upper locators 40. Each upper locator 40 may include a second or upper locating pin 42 and a platform 44 (FIG. 1) adapted to engage the overhead carrier 16. Engagement of the overhead carrier 16 with the upper locating pin 42 may facilitate alignment along the x-axis 18 and the y-axis 20. Engagement of the overhead carrier 16 with the platform 44 may facilitate alignment along the z-axis 22.

Each stem 34 may include a track 46 into which a traveling portion 48 is at least partially disposed. The traveling portion 48 is adapted to translate substantially parallel to the z-axis 22 within the track 46. The lower locators 36 are coupled to respective traveling portions 48. Accordingly, when the carrier cart 14 is engaged with the lower locators 36 of the lift 12, the carrier cart 14 is also translatable substantially parallel to the z-axis 22.

The carrier cart 14 (FIG. 2) includes a frame 60 and a plurality of wheels 62. The frame 60 is adapted to support a vehicle chassis (see, e.g., chassis 110 of FIG. 3). In certain embodiments, the frame 60 may include one or more mechanical features, such as protrusions 64, to engage the chassis and prevent the chassis from sliding off of the frame 60 during motion of the carrier cart 14. The frame 60 is adapted to engage the lower locators 36 of the lift 12. The frame 60 may include a plurality of receptacles 66. The plurality of receptacles 66 may be configured to receive a respective plurality of lower locating pins 38.

The overhead carrier 16 includes a ceiling 80. The ceiling 80 includes a plurality of ceiling bars 82 extending in a fore-and-aft direction (e.g., substantially parallel to the x-axis 18. The overhead carrier 16 may be suspended from the overhead rail system, such as by the ceiling 80. A plurality of legs 84 extend from the ceiling 80. The legs 84 are configured to extend around an outside of a vehicle body (see, e.g., vehicle body 112 of FIG. 3). In the embodiment shown, the legs 84 extend outward and downward (i.e., in the negative z-direction 26) with respect to the ceiling 80. The legs 84 may be curved to accommodate a size and shape of one or more different types of vehicle bodies.

The overhead carrier 16 may further include two or more plates 86, two or more feet 88, and two or more supports 90. The plates 86 may include a pair of plates 86 disposed on opposite sides of the overhead carrier 16. The plates 86 may be coupled to distal ends 91 of the legs 84. Each plate 86 may extend between two or more legs 84 in the fore-and-aft direction (e.g., substantially parallel to the x-axis 18).

The feet 88 may be coupled to the plates 86. In the embodiment shown, the overhead carrier 16 includes four feet 88, with two feet 88 being coupled to each plate 86. The feet 88 are configured to engage the vehicle body to support the vehicle body on the overhead carrier 16.

The supports 90 are coupled to the overhead carrier 16. The supports 90 may be coupled to the overhead carrier 16 via the plates 86. For example, each support 90 may be coupled to an underside surface 92 of the plate 86. The supports 90 may be spaced apart from the feet 88 parallel to at least one of the x-axis 18 and the y-axis 20. In certain embodiments, each support 90 is coupled to a respective foot 88 through both a support bar 94 and the plate 86.

In certain embodiments, one or more of the supports 90 may be movable on the overhead carrier 16 substantially parallel to at least one of the x-axis 18, the y-axis 20, and the z-axis 22. Locations of the supports 90 may be adjusted to accommodate different sizes and shapes of vehicles. In one example, the supports 90 are slidable on the plates 86 substantially parallel to the x-axis 18. In another example, the supports 90 are movable with respect to the plates 86 substantially parallel to both the x-axis 18 and the y-axis 20.

With reference to FIG. 3, a chassis 110 and a body 112 of a vehicle are provided at the marriage station 10, with the marriage station 10 being in the engaged configuration. The lift 12 is disposed on a surface or floor 114. The chassis 110 is supported on the carrier cart 14 adapted to travel along the floor 114. The carrier cart 14 engages a first region 116 of the chassis 110 to support the chassis 110. The body 112 is supported by the overhead carrier 16 and spaced apart from the supports 90.

When the chassis 110 is subsequently transferred from the carrier cart 14 to the overhead carrier 16, the support 90 of the overhead carrier 16 may engage a second region 118 of the chassis (see, e.g., FIG. 7E). The second region 118 may be distinct from the first region 116. The body 112 may directly engage the chassis 110 and be spaced apart from the overhead carrier 16. Both the chassis 110 and the body 112 may be supported by the overhead carrier 16.

When both the chassis 110 and the body 112 are supported by the overhead carrier 16, the body 112 may be supported by the chassis 12. More particularly, the body 112 may directly engage the chassis 110, and the chassis 110 may directly engage the supports 90. Therefore, the body 112 may be spaced apart from the supports 90 and not directly engaged with the supports 90. The body 112 may also be spaced apart from the feet 88.

Figure 4:
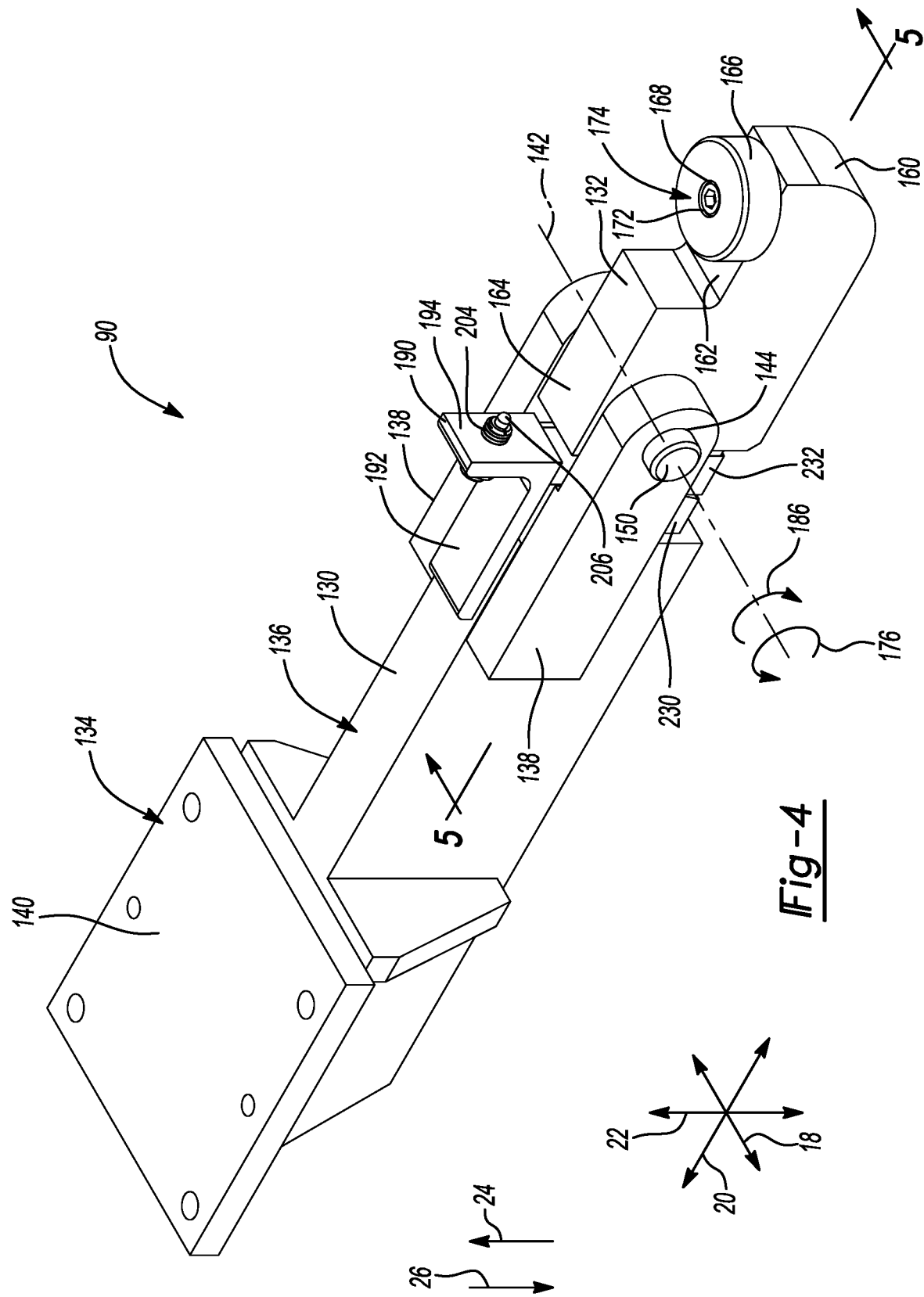
FIG. 4 is a perspective view of a support of an overhead carrier of FIG. 1.
Figure 5:
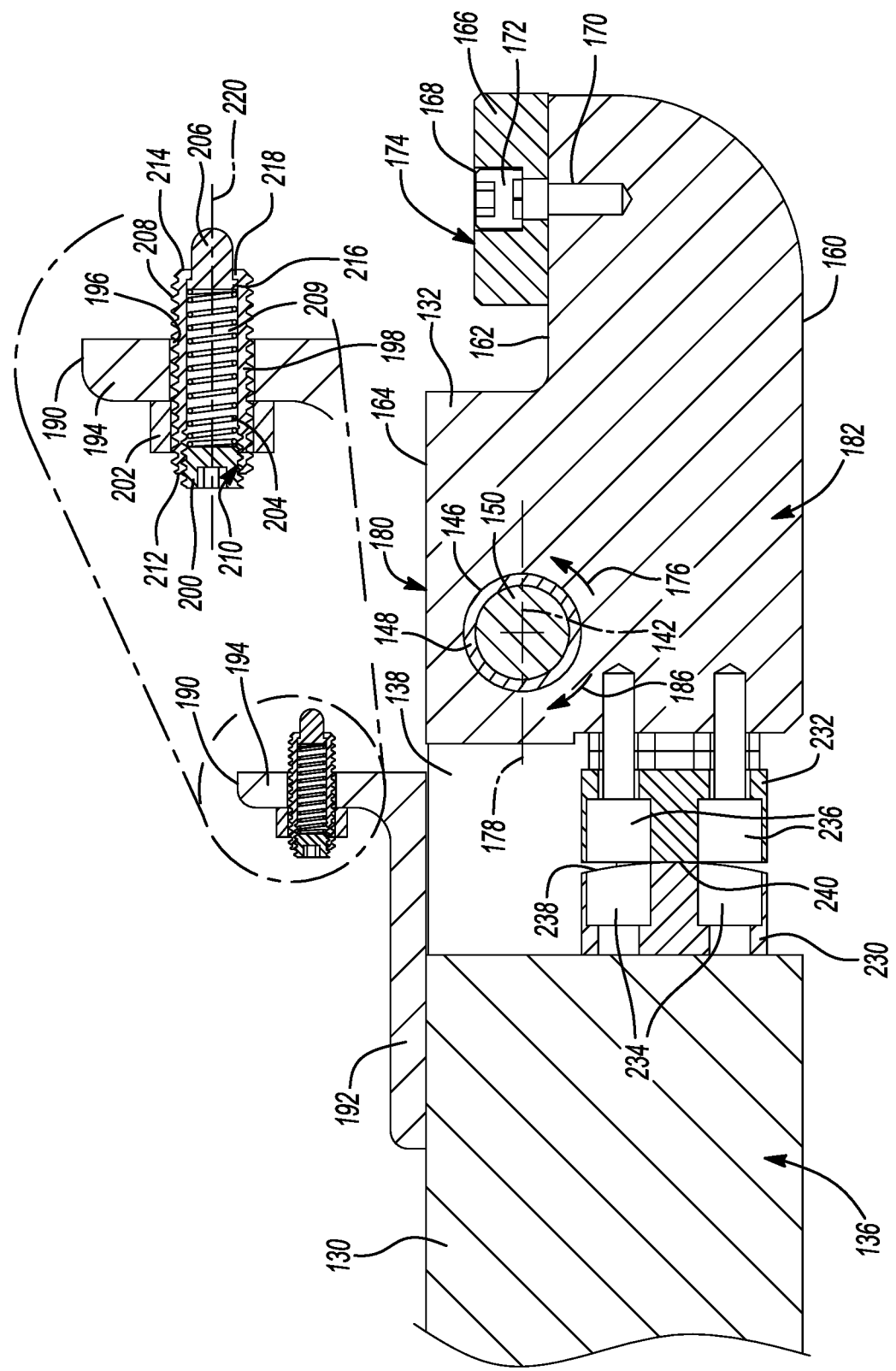
FIG. 5 is a partial sectional view of the support of FIG. 4.

Referring to FIGS. 4-5, the support 90 according to the principles of the present disclosure is provided. The support 90 includes a base 130 and a finger 132 that is pivotally connected to the base 130. The base 130 is coupled to the overhead carrier 16 (FIGS. 1-3). In certain embodiments, the base 130 may be omitted so that the entire support 90 is pivotable with respect to the overhead carrier 16 (e.g., the plate 86 of the overhead carrier 16).

The base 130 may include an attachment portion 134 (FIG. 4), a main portion 136, and a pair of arms 138. The attachment portion 134 may include an attachment surface 140 that is directly coupled to the overhead carrier 16, such as at the underside surface 92 of the plate 86. The main portion 136 may project from the attachment portion 134. In certain embodiments, the main portion 136 may be extend substantially parallel to the y-axis 20. The main portion 136 may be disposed inward (i.e., toward a lateral center of the overhead carrier 16) of the attachment portion 134. The main portion 136 may be at least partially disposed between the arms 138. Portions of the arms 138 are disposed inward of the main portion 136. The attachment portion 134, the main portion 136, and the arms 138 may be separate components that are coupled to one another, or they may be integrally formed as a single component.

The finger 132 is pivotally coupled to the base 130 via the arms 138. The finger 132 is pivotable with respect to the base 130 about a pivot axis 142. The finger 132 may be pivotable between a first position (FIGS. 4-5, 7A, and 7D-7E) and a second position (FIG. 7C). In the first position, the finger 132 extends substantially parallel with the base 130. At least a portion of the finger 132 is disposed within a path of travel of the chassis 110 substantially parallel to the z-axis 22. In the second position, the finger 132 extends substantially perpendicular to the base 130. The finger 132 is disposed outside of the path of travel of the chassis 110.

Each of the arms 138 may include a first aperture 144 (FIG. 4). The finger 132 may include a second aperture 146 (FIG. 5). A bushing 148 (FIG. 5) may be disposed at least partially within the second aperture 146. A pin 150 may extend through the first apertures 144 and the bushing 148 to pivotally couple the finger 132 to the arms 138.

The finger 132 may include a first surface 160, a second surface 162, and a third surface 164. At least a portion of the first surface 160 may be rounded or curved. The second surface 162 may be disposed inward of the third surface 164. The second and third surfaces 162, 164 may extend substantially parallel to one another.

The support 90 may further include a pad 166 that is coupled to the second surface 162 of the finger 132. The pad 166 may include a third aperture 168 (FIG. 5) and the finger 132 may include a fourth aperture 170. A first fastener 172 may extend through the third and fourth apertures 168, 170 to couple the pad 166 to the finger 132. The pad 166 may include a planar portion 174 that is adapted to engage the second region 116 of the chassis 110 (FIG. 7E). In certain embodiments, the pad 166 may be omitted from the support 90 so that the finger 132 is adapted to directly engage the chassis 110.

At least a portion of the first surface 160 of the finger 132 may be rounded or curved. Thus, the first surface 160 may be referred to as a rounded portion. The first surface 160 is adapted to slidingly engage the chassis 110. Engagement of the chassis 110 with the first surface 160 causes the finger 132 to pivot in a first rotational direction 176 about the pivot axis 142, such as from the first position to the second position.

The finger 132 may biased in the first position. More particularly, a shape and weight distribution of the finger 132 may cause it to return to the first position under the influence of gravity when it is free of an opposing force (e.g., engagement with the chassis 110). In certain embodiments, a location of the pin 150 may facilitate returning the finger 132 to the first position.

In some embodiments, a center plane 178 (FIG. 5) may extend through a center of the pin 150. The finger 132 may include a first finger portion 180 on one side of the center plane 178 and a second finger portion 182 on the other side of the center plane 178. In the first position, the first finger portion 180 may be disposed in the positive z-direction 24 with respect to the second finger portion 182 when the finger 132 is in the first position. The first finger portion 180 may have a first weight and the second finger portion 182 may have a second weight greater than the first weight. When the finger 132 is in the second position, a net torque due to gravity causes the finger 132 to rotate in a second rotational direction 186 opposite the first rotational direction 176 to return the support 90 to the first position.

The support 90 may further include a spring-loaded stop 190. The spring-loaded stop 190 may prevent the finger 132 from rotating past the second position in the first rotational direction 176. The spring-loaded stop 190 may also facilitate returning the finger 132 to the first position, such as if the finger 132 becomes stuck in the second position. The spring-loaded stop 190 may be coupled to the base 130. As best shown in FIG. 5, the spring-loaded stop 190 may include a first wall 192, a second wall 194, a fifth aperture 196, a hollow threaded rod 198, a threaded fastener 200, a nut 202, a compression spring 204, and a button 206.

The first wall 192 may be coupled to the main portion 136 of the base 130. The second wall 194 may extend substantially perpendicular to the first wall 192 in the positive z-direction 24. The second wall 194 may include the fifth aperture 196. A portion of the hollow threaded rod 198 may extend through the fifth aperture 196. The nut 202 may engage a threaded outside surface 208 of the hollow threaded rod 198 to set a position of the hollow threaded rod 198 within the fifth aperture 196.

The compression spring 204 may be disposed within an interior region 209 of the hollow threaded rod 198. The threaded fastener 200 may engage a threaded inner surface portion 210 of the hollow threaded rod 198 at a first end 212 of the hollow threaded rod 198. The button 206 may be disposed partially within the interior region 209 of the hollow threaded rod 198 at a second end 214 of the hollow threaded rod 198. A flange 216 of the button 206 may engage a lip 218 of the hollow threaded rod 198. The compression spring 204 may be disposed between the threaded fastener 200 and the button 206, and abutting the threaded fastener 200 and the button 206. The compression spring 204 may be maintained within the interior region 209 of the hollow threaded rod 198 due to engagement with the threaded fastener 200 and the button 206.

The button 206 may be free to translate toward the compression spring 204 along a stop axis 220. When the finger 132 is in the second position, the third surface 164 of the finger 132 may engage the button 206 to cause the button 206 to translate along the stop axis 220 and compress the compression spring 204, thereby generating a biasing force to cause the finger 132 to rotate in the second rotational direction 186.

In the embodiment shown, both (1) the shape and weight distribution of the finger 132 and (2) the spring-loaded stop 190 cause the finger 132 to be biased in the first position. However, in certain embodiments, the support 90 may omit the spring-loaded stop 190 and rely only on shape and weight to bias the finger 132 in the first position. In certain other embodiments, the support 90 may have an even weight distribution on first and second finger portions 180, 182 and rely only on the spring-loaded stop 190 to bias the finger 132 in the first position. In yet other embodiments, the support 90 may include different or additional features, such as a torsion spring, to bias the finger 132 in the first position.

The finger 132 may be prevented from rotating past the first position in the second rotational direction 186 due to engagement of a first stop block 230 on the base 130 with a second stop block 232 on the finger 132. As best shown in FIG. 5, the first stop block 230 may be coupled to the main portion 136 of the base 130 by a plurality of second fasteners 234. The second stop block 232 may be coupled to the finger 132 by a plurality of third fasteners 236. In certain embodiments, the first stop block 230 has a rounded outer surface 238 and the second stop block 232 has a planar outer surface 240. The planar outer surface 240 engages the rounded outer surface 238 when the finger 132 is in the first position.

With reference to FIGS. 6-7E, a method of interconnecting a chassis and a body of a vehicle according to the principles of the present disclosure is provided. The method is described in the context of the marriage station 10 of FIGS. 1-3. At 310, the method includes supporting the chassis 110 on the carrier cart 14. At 314, the method includes supporting the body 112 on the overhead carrier 16. The overhead carrier 16 is disposed in the positive z-direction 24 with respect to the carrier cart 14. Steps 310 and 314 may be performed concurrently or sequentially (e.g., step 310 may be performed prior to beginning step 314, or step 314 may be performed prior to beginning step 310).

At 318, the method may include aligning the chassis 110 and the body 112 with one another along the x-axis 18 and the y-axis 20. In certain embodiments, aligning the chassis 110 and the body 112 with one another may include adjusting a location of at least one of the carrier cart 14 and the overhead carrier 16 along at least one of the x-axis 18 and the y-axis 20. For example, aligning the chassis 110 and the body 112 with one another may include aligning the chassis 110 in the lift 12 and aligning the body 112 in the lift 12. Aligning the chassis 110 in the lift 12 may include engaging the carrier cart 14 with the lower locators 36 of the lift 12, such as by translating the carrier cart 14 along the floor 114. Aligning the body 112 in the lift 12 may include engaging the overhead carrier 16 on the upper locators 40 of the lift 12. Engaging the overhead carrier 16 on the upper locators 40 may include translating the overhead carrier in a direction substantially parallel to the floor 114. Engaging the overhead carrier 16 on the upper locators 40 may further include translating the overhead carrier 16 in the negative z-direction 26.

At 322, the method may optionally further include adjusting locations of one or more supports 90 on the overhead carrier 16. For example, a location of the supports 90 may be adjustable along at least one of the x-axis 18, the y-axis 20, and the z-axis 22. The locations of the supports 90 may be adjusted to accommodate different sizes and shapes of chassis 110 and bodies 112. Step 322 may be performed at any time prior to step 326, such as immediately prior to step 310, immediately prior to step 314, immediately prior to step 318, or immediately prior to step 326, by way of example.

At 326, the method includes translating the carrier cart 14, along with the chassis 110, in the positive z-direction 24. At 330, the method further includes interconnecting the chassis 110 and the body 112 to form an interconnected chassis and body. Interconnecting the chassis 110 and the body 112 may be performed by translating the chassis 110 into physical contact with the body 112. Therefore, step 330 may be performed concurrently with step 326. In some embodiments, step 330 may be performed at another time after initiating step 326, such as after step 342, concurrently with step 342, after step 346, or concurrently with step 346.

At 334, the method may include coupling the chassis 110 to the body 112. The chassis 110 may be coupled to the body 112 by a plurality of fasteners. In certain embodiments, the method may optionally include pausing translation of the carrier cart 14 during coupling. In certain alternative embodiments, step 334 may be performed later in the method after step 330 is completed, such as immediately after step 338, immediately after step 342, immediately after step 346, immediately after 5354, or immediately after step 358, by way of example.

At 338, the body 112 is disengaged from the overhead carrier 16. The body 112 may be disengaged from the overhead carrier 16 while the carrier cart 14 is translated in the positive z-direction 24, concurrently with step 326, and after the chassis and any time after the chassis 110 and the body 112 are interconnected at step 330.

At step 342, the method includes shifting the supports 90 from the first position to the second position, as shown in FIGS. 7A-7C. Step 342 may be performed concurrently with step 326. At FIG. 7A, the chassis 110 is translated in the positive z-direction 24. A third region 340 of the chassis 110 slidingly engages the first surface 160 (i.e., rounded portion) of the finger 132 of the support 90. As shown in FIG. 7B, the chassis 110 pushes the finger 132 in the positive z-direction 24, causing the finger 132 to pivot in the first rotational direction 176 about the pivot axis 142. As shown in FIG. 7C, as the finger 132 pivots into the second position, the finger 132 is outside of the path of travel of the chassis 110. Therefore, the chassis 110 is free to slide past the finger 132 while in communication with the first surface 160 of the finger 132.

At step 346, the method further includes shifting the supports 90 from the second position to the first position. Step 346 may be performed concurrently with step 326. As shown at FIG. 7D, when the chassis 110 disengages the finger 132, the finger 132 is free to return to the first position. The chassis 110 may be disposed in the positive z-direction 24 with respect to the support 90. The finger 132 may be adapted to automatically return to the first position, such as by its weight distribution and/or engagement with the spring-loaded stop 190. Step 346 may be performed concurrently with step 326, or after 326 (e.g., of the chassis 110 ceases translation along the z-axis 22).

At step 350, the method includes translating the carrier cart 14 in the negative z-direction 26. The carrier cart 14 may support both the chassis 110 and the body 112 (i.e., the interconnected chassis and body). At step 354, as shown at FIG. 7E, the method may include supporting the interconnected chassis and body on the supports 90. The second region 118 of the chassis 110 may engage the planar portion 174 of the finger 132.

At step 358, the method may include disengaging the carrier cart 14 from the chassis 110. After disengaging the carrier cart 14 from the chassis 110, the chassis 110 and the body 112 are entirely supported by the overhead carrier 16. The carrier cart 14 may be disengaged from the chassis 110 by continuing to translate the carrier cart 14 in the negative z-direction 26. In certain embodiments, step 354 and step 358 are both performed concurrently with step 350.

At 362, the overhead carrier 16 may transport the interconnected chassis and body to another station in the vehicle assembly process.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of interconnecting a chassis and a body of a vehicle, the method including:
   supporting the chassis on a first carrier;
   supporting the body on a second carrier, the second carrier being suspended in a positive z-direction with respect to the first carrier;
   translating the first carrier in the positive z-direction toward the second carrier;
   interconnecting the chassis and the body to form an interconnected chassis and body;
   shifting a plurality of supports from a first position in a path of travel of the chassis to a second position outside of the path of travel of the chassis by pivoting at least a portion of each support of the plurality of supports about a pivot axis, the plurality of supports being coupled to the second carrier and spaced apart from the body;
   shifting the plurality of supports from the second position to the first position by pivoting at least a portion of each support of the plurality of supports about the pivot axis;
   translating the first carrier in a negative z-direction toward the plurality of supports; and
   supporting the interconnected chassis and body on the second carrier by engaging the chassis with the plurality of supports in the first position.

2. The method of claim 1, wherein shifting the plurality of supports from the first position to the second position is performed concurrently with translating the first carrier in the positive z-direction.

3. The method of claim 2, wherein shifting the plurality of supports from the first position to the second position comprises slidingly engaging the chassis with the at least a portion of each support of the plurality of supports during translating the first carrier in the positive z-direction.

4. The method of claim 3, wherein shifting the plurality of supports from the second position to the first position comprises disengaging the chassis from the at least a portion of each support of the plurality of supports.

5. The method of claim 4, wherein shifting the plurality of supports from the second position to the first position further comprises engaging a surface of the at least a portion of each support of the plurality of supports with a respective spring-loaded stop, each spring-loaded stop being adapted to apply a biasing force to pivot the at least a portion about the pivot axis to return the plurality of supports to the first position.

6. The method of claim 1, wherein each support of the plurality of supports is biased in the first position.

7. The method of claim 1, wherein interconnecting the chassis and the body is performed concurrently with translating the first carrier in the positive z-direction.

8. The method of claim 1, wherein shifting the plurality of supports from the second position to the first position is performed concurrently with translating the first carrier in the positive z-direction.

9. The method of claim 1, further comprising disengaging the body from the second carrier.

10. The method of claim 9, wherein disengaging the body from the second carrier is performed during translating the first carrier in the positive z-direction and after interconnecting the chassis and the body.

11. The method of claim 1, wherein interconnecting the chassis and the body is performed prior to shifting the plurality of supports from the first position to the second position.

12. The method of claim 1, wherein:
   supporting the chassis on the first carrier comprises engaging the first carrier with a first region on the chassis; and
   supporting the interconnected chassis and body on the second carrier comprises engaging the plurality of supports with a second region on the chassis.

13. The method of claim 1, further comprising disengaging the first carrier from the chassis after supporting the interconnected chassis and body on the second carrier.

14. The method of claim 13, wherein supporting the interconnected chassis and body on the second carrier and disengaging the first carrier from the chassis are performed concurrently with translating the first carrier in the negative z-direction.

15. The method of claim 1, further comprising aligning the chassis and the body along an x-axis and a y-axis by adjusting locations of at least one of the first carrier and the second carrier.

16. The method of claim 15, wherein adjusting locations of at least one of the first carrier and the second carrier comprises engaging the first carrier with a four-post lift and engaging the second carrier with the four-post lift, the four-post lift being adapted to translate the first carrier along a z-axis.

17. The method of claim 1, further comprising adjusting locations of one or more supports of the plurality of supports on the second carrier along at least one of an x-axis and a y-axis.

18. The method of claim 1, further comprising coupling the chassis to the body after interconnecting the chassis to the body.

19. The method of claim 1, wherein each support of the plurality of supports comprises a base coupled to the second carrier and a finger pivotally connected to the base, the at least a portion of each support of the plurality of supports comprising the finger.

20. The method of claim 19, wherein:
   the finger includes a rounded portion adapted to engage the chassis during the translating the chassis in the positive z-direction; and
   the finger includes a planar portion adapted to engage the chassis during supporting the interconnected chassis and body on the second carrier.

\* \* \* \* \*